United States Patent [19]

Hatto et al.

[11] Patent Number: 5,328,702

[45] Date of Patent: Jul. 12, 1994

[54] METHOD FOR PREPARING A SOLUTION CONTAINING WATER-SOLUBLE MINERALS

[75] Inventors: Makoto Hatto, 19-7-408, Kitasuna 5-Chome Koto-ku, Tokyo 136; Masakazu Saito, 169-1, Nishicho, Ryoshinden Soka-shi, Saitama 340, both of Japan

[73] Assignees: Keiji Takagi, Gunma; Makoto Hatto, Tokyo; Masakazu Saito, Saitama, all of Japan

[21] Appl. No.: 853,767

[22] PCT Filed: Oct. 28, 1991

[86] PCT No.: PCT/JP91/01468

§ 371 Date: Jun. 2, 1992

§ 102(e) Date: Jun. 2, 1992

[87] PCT Pub. No.: WO92/07796

PCT Pub. Date: May 14, 1992

[30] Foreign Application Priority Data

Oct. 30, 1990 [JP] Japan .................................. 2-290869

[51] Int. Cl.$^5$ ................................................ A23L 2/00
[52] U.S. Cl. ........................................ 426/18; 426/44; 426/52; 426/66; 426/74
[58] Field of Search ............... 426/66, 7, 18, 20, 44, 426/52, 74; 423/580

[56] References Cited

U.S. PATENT DOCUMENTS

| 3,846,560 | 11/1974 | Hempenius et al. | 426/18 |
| 4,308,284 | 12/1981 | Noda et al. | 426/18 |
| 4,636,390 | 1/1987 | Segard et al. | 426/18 |

FOREIGN PATENT DOCUMENTS 55-167087  12/1980  Japan .

Primary Examiner—George Yeung
Attorney, Agent, or Firm—Frishauf, Holtz, Goodman & Woodward

[57] ABSTRACT

A method for preparing a solution containing water-soluble minerals comprising the steps of pulverizing and mixing starch or cereal, seed having water-soluble mineral contents and egg shell, adding water to form an aqueous mixture and agitating the same while heating to approximately 80° C. to form a viscous mixture, fermenting the mixture by adding koji to the mixture, and aging the fermented mixture to cause the water-soluble mineral contents in the seed to be dissolved into the aqueous mixture and filtering the resultant fermented and aged mixture to obtain the solution of water-soluble minerals.

3 Claims, 4 Drawing Sheets

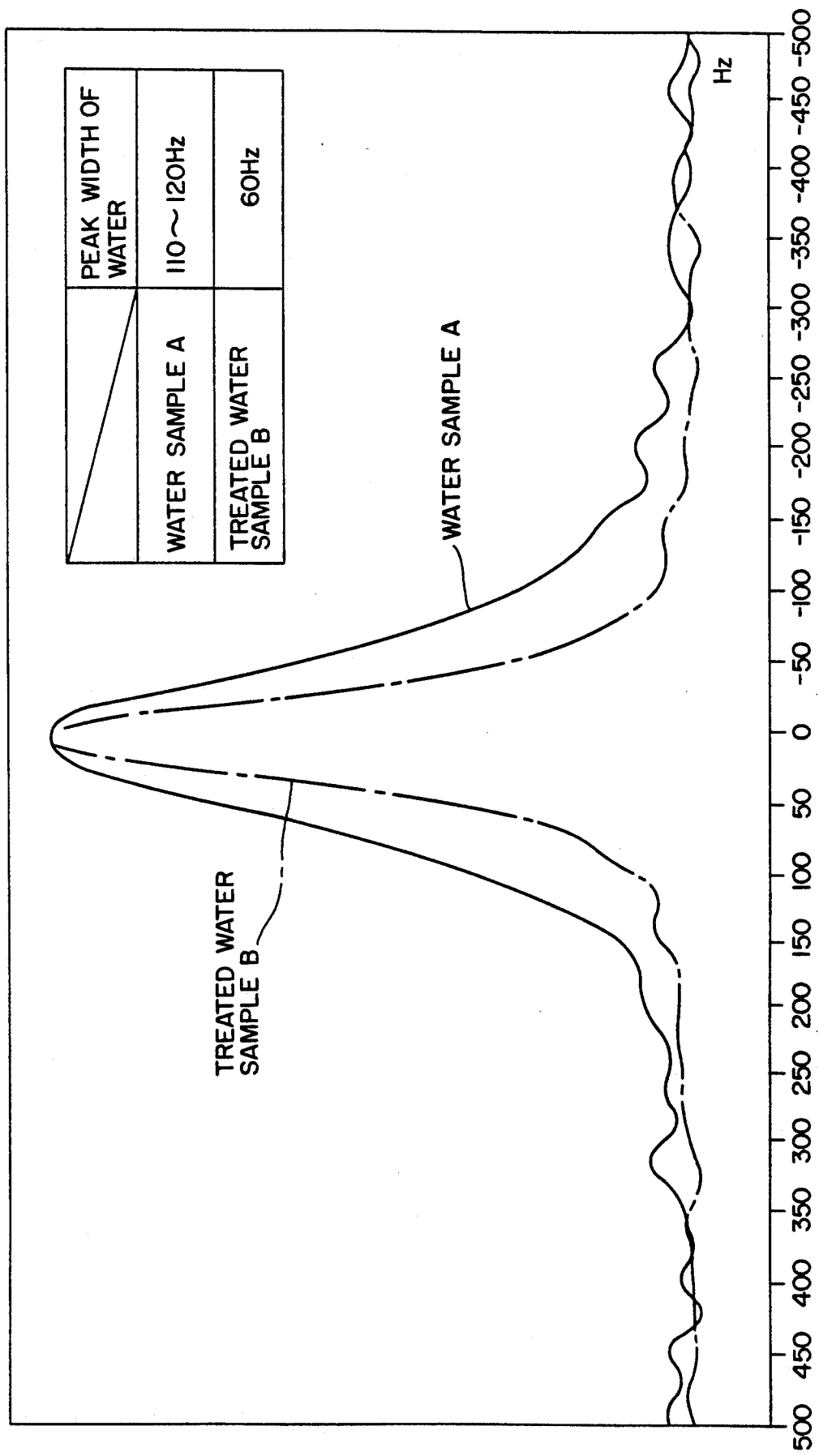

(UNIT ; mg/l)

| | FREED RESIDUAL CHLORINE | AFTER 5 MINUTES | AFTER 15 MINUTES |
|---|---|---|---|
| TAP WATER | 0.9 | 0.8 | 0.8 |
| AFTER LEFT STANDING FOR 30 MINUTES | 0.6 | 0.65 | 0.65 |
| IONIZED MINERAL 500 ppm " 1 DROP/100 ml | 0.55 | 0.6 | 0.6 |
| IONIZED MINERAL 1000 ppm " 2 DROPS/100 ml | 0.25 | 0.35 | 0.35 |
| TAP WATER | 1.5 | 1.5 | |
| IONIZED MINERAL 1000 ppm 2 DROPS/100 ml | 1.2 | 1.2 | |
| IONIZED MINERAL 2500 ppm 5 DROPS/100 ml | 0.7 | 0.7 | |
| TAP WATER | 1.5 | 1.5 | |
| IONIZED MINERAL 1000 ppm | 1.2 1.2 | 1.2 1.2 | |
| IONIZED MINERAL 2500 ppm | 0.7 | 0.7 | |
| TAP WATER + $Cl_2$ | 2.2 | 2.2 | |
| AFTER LEFT STANDING FOR 30 MINUTES | 2.1 | 2.1 | |
| IONIZED MINERAL 1000 ppm " 2 DROPS/100 ml | 1.7 | 1.7 | |

FIG. 4

METHOD FOR PREPARING A SOLUTION CONTAINING WATER-SOLUBLE MINERALS

TECHNICAL FIELD

The present invention relates to a method of fractionizing clusters of water molecules to improve the water quality. It also relates to a solution containing water-soluble minerals for use in said fractionization, and a method of preparing said solution.

PRIOR ART

Recent progress in the industrial production has remarkably enriched the consumers' life. On the other hand, however, the quality of drinking water, in other words, the tap water, has deteriorated.

The stock water such as rain water and river water is filtered and purified to remove substances harmful to the human body and is supplied as the tap water. Because of pollution of the stock water itself and of the water sources such as rivers, and because of eutrophication of the reservoirs, various chemicals are added to the stock water to clean the same. Complaints such as "the tap water smells musty", ". . . smells like chemicals", or ". . . tastes so bad and is hardly potable," are frequently heard among the general public. The "unsavory" water (tap water) has been analyzed to contain large amounts of organic substances such as potassium permanganate and residual chlorine used in the disinfection treatment. An attempt has been made to analyze the mineral contents (metal ions) in water to evaluate whether the water is "savory". This method is not universally valid as "the taste of water" may differ even if the mineral contents are the same in different samples.

The molecular structure of water including the tap water is generally expressed as $H_2O$. In reality, however, water seldom exists in the form of single molecules but is present in the form of molecular clusters of at least five molecules or more due to hydrogen bonding. Moreover, it is known that these clusters are not static but are dynamic, continually changing by forming or disintegrating large clusters in an extremely short period of time of one pico second ($10^{-12}$ second). Because of scarcity of mineral contents, distilled water and ultra pure water are considered unsuitable as drinking water. These waters have been found to be constituted by a number of large molecular clusters in which unpaired electrons of oxygen molecules are firmly bonded with hydrogen molecules. Nuclear Magnetic Resonance (NMR) spectroscopy also revealed that those waters that are ranked "savory" not only contain less amount of organic substances and residual chlorine but are of smaller molecular clusters and contain optimum amounts of mineral contents.

DISCLOSURE OF THE INVENTION

In view of the foregoing, the present invention attempts to fractionalize the molecular clusters of water to thereby improve the water quality by adding a predetermined amount of solution containing water-soluble minerals to water which comprises plural molecular clusters associated by hydrogen bonding among the water molecules.

Said solution of water-soluble minerals to be used in the fractionization of molecular clusters of water is an aqueous solution obtained by pulverizing and mixing starch and/or cereal, seed and egg shell, adding water to the mixture to give rise to fermentation and aging, and filtering the mixture. The resultant fermented and aged solution preferably contains 5 to 9 weight % of mineral contents.

The solution containing water-soluble minerals is prepared preferably by pulverizing and mixing a predetermined amount of starch and/or cereal, seed and egg shell, adding water to and mixing the mixture under heating to obtain a viscous mixture, adding koji (*Aspergillus oryzae*) to give rise to fermentation and aging as well as to dissolve and cause migration of minerals contained in the seed, and filtering the resultant fermented and aged mixture. For effective fermentation, air is introduced into the mixture under agitation and light is irradiated thereon. Electrolysis treatment of the mixture while causing the mixture to flow during aging will further promote efficient and effective aging.

BRIEF DESCRIPTION OF THE DRAWINGS

FIG. 2 is an explanatory view to show the NMR spectrograph of the atomic nuclei of oxygen ($^{17}O$) of the tap water (water sample A) and the experiment water (treated water sample B).

FIG. 4 is a table to show changes in the content of residual chlorine in the tap water sample and the tap water sample added with the solution of water-soluble minerals according to the present invention.

PREFERRED MODE OF EMBODIMENT

The present invention fractionization method of molecular clusters of water will now be explained starting from preparation of a solution containing water-soluble minerals used in the present invention fractionization.

Figure 1:
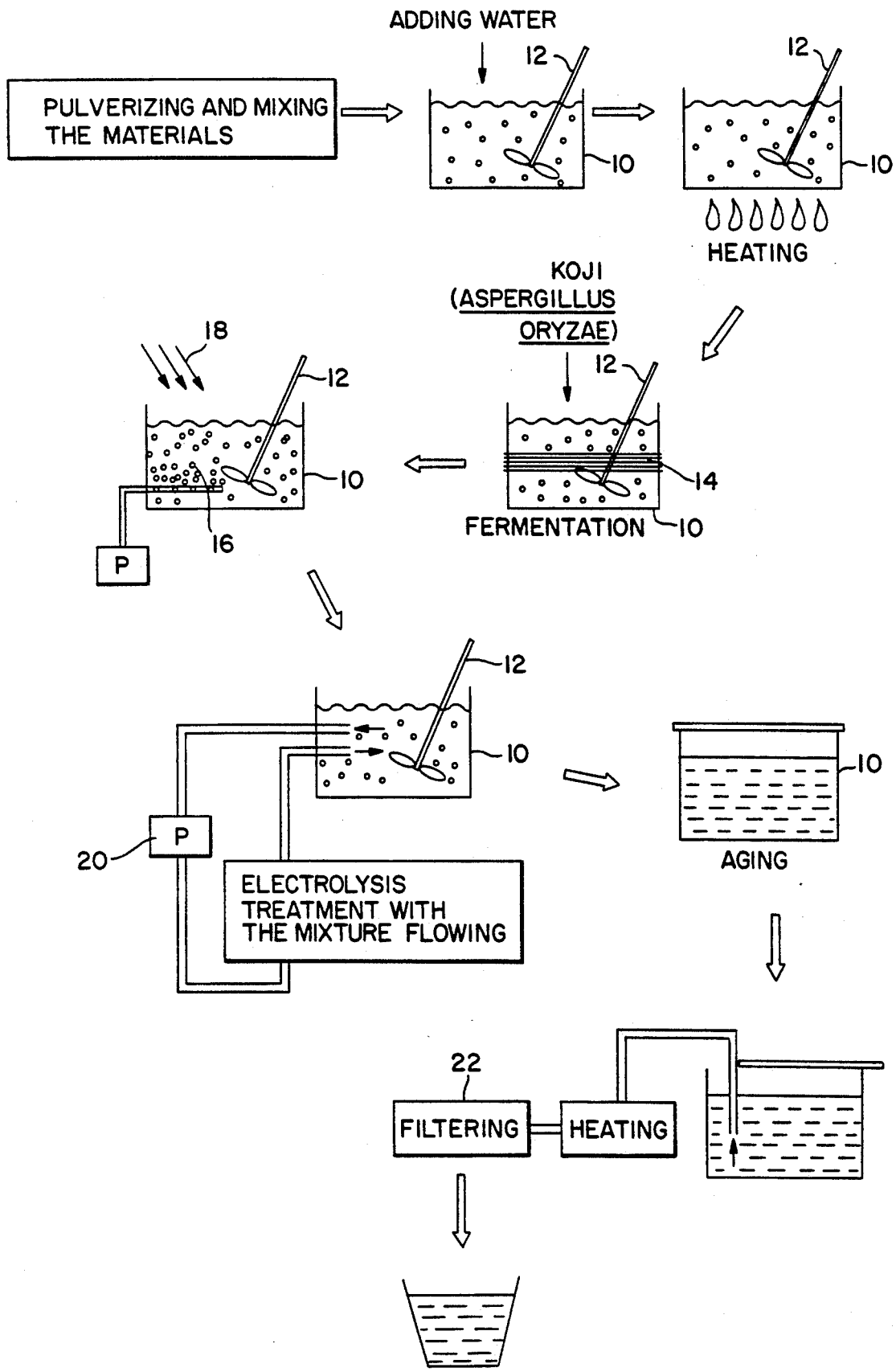
FIG. 1 is an explanatory view to show the process of preparing the solution of water-soluble minerals to be used in the fractionization of molecular clusters of water according to the present invention.

Preparation of the solution of water-soluble minerals to be used in the method for fractionizing molecular clusters of water according to the present invention will now be described referring to FIG. 1.

Flours of cereal such as rice, buckwheat, wheat and cornstarch, and/or starch such as potato starch, and fruit seed such as of walnut, apricot, yellow and white peaches, plum, and 'ume', and egg shell are mixed at the ratio in weight of 2.5:3.0:0.5 and pulverized.

The pulverized and mixed stock material is charged in a fermentation tank 10 and added with water at the ratio of 3:1 as against the pulverized and mixed material. The mixture is heated to approximately 80° C. under adequate agitation using a known agitating means 12 to pregelatinize the starch. The mixture is then kept warm to increase viscosity.

The mixture is maintained at approximately 35° C. by a heater 14, added with a predetermined amount of koji (*Aspergillus oryzae*) to give rise to complex fermentation. To promote fermentation, it is preferable to supply air bubbles 16 using an air supply means such as a pumping device, as well as to irradiate the mixture with special rays 18 while the mixture is under agitation.

The mixture subjected to complex fermentation is then left standing for about two months to let the mixture age. This causes the mineral contents in the pulverized seed to become dissolved and migrate into the mixture. It is again preferable to agitate the mixture with said agitating means 12 and to subject the mixture to electrolysis while the mixture is being caused to slowly flow by a pumping device 20. Although the fermented mixture in this particular Example is subjected to electrolysis for aging while the mixture is being caused to flow, it is also possible to employ the method of oxidation (aging) with infrared rays in which far infrared rays emitted by an infrared ray emitting device are irradiated on the fermented mixture via a reflecting mirror, or the method in which the mixture is caused to flow in an electric field.

As the fermented mixture is sufficiently aged, the mixture is heated for sterilization and then filtered by a filtering means 22 to extract a solution containing water-soluble minerals.

Analysis of the mineral contents (ash) of the resultant solution of water-soluble minerals revealed that the solution contained 5.6 wt % of minerals (ash) and was at about pH 5.2. The solution contained, on the basis of 100 g of the solution, 21,00 mg of calcium, 68 mg of magnesium, 130 mg of sodium, 6 mg of potassium, 0.5 mg of iron, and trace amount each of mineral elements such as phosphor, copper, zinc, manganese, sulfur and silicon as the mineral ions.

Although the amount of mineral contents (ash) in the solution of water-soluble minerals can be suitably increased/decreased by adjusting the ratio of seed in the stock material (cereal, starch, seed and egg shell), said amount is preferably in the range of 5–9 wt % in view of the amount of the solution of water-soluble minerals to be added (ratio of dilution) at the time of fractionization.

EXPERIMENT EXAMPLE

A predetermined amount of tap water (water sample A), was added with said solution of water-soluble minerals at the ratio of 500:1 to obtain a test water sample (treated water sample B), which was subjected to NMR spectroscopy at 20° C. to obtain a spectrograph of atomic nuclei ($^{17}O$) of oxygen (see FIG. 2).

The NMR spectrograph indicates that whereas the peak width of resonance signal of the treated water sample B was 60 Hz, that of the water sample A was 110 Hz, which was narrower by about 45.5%.

Figure 3A:
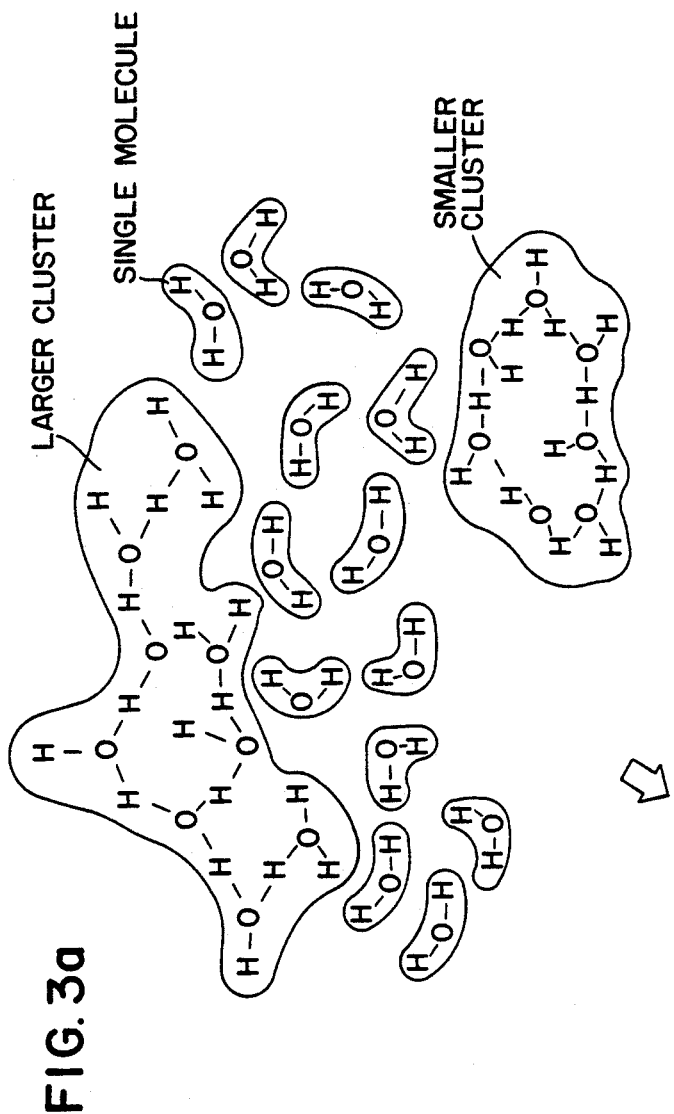
FIG. 3a is a schematic view to show the cluster model of ordinary water such as the water sample shown in FIG. 2.
Figure 3B:
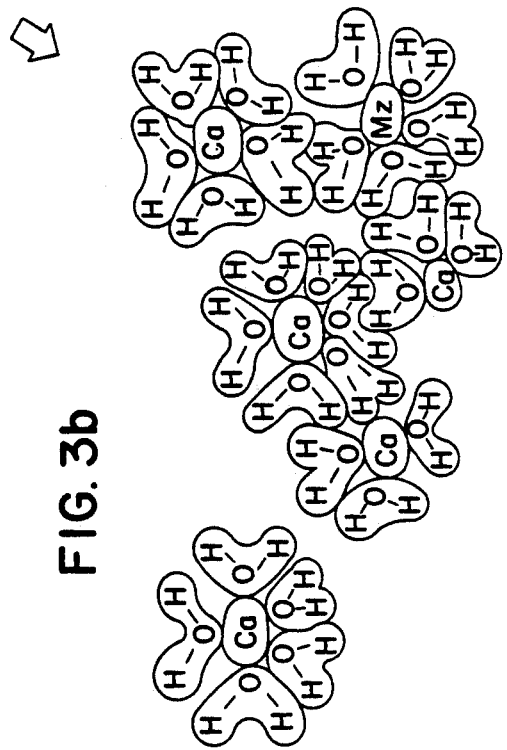
FIG. 3b is a schematic view to show the cluster model of the treated water sample shown in FIG. 2.

The narrower peak width in the NMR spectrograph means that the molecular movements of a substance under observation is accelerated. This in turn means that as compared to the cluster model of ordinary water shown in FIG. 3a, larger or smaller clusters of water molecules have been fractionized into single molecules as a result of severance of hydrogen bonds among the water molecules, and the clusters fractionized into single molecules have surrounded mineral contents (ionized atoms of metal), indicating that the molecular clusters themselves are fractionized, as shown in FIG. 3b. The molecular clusters of water in the treated water sample B are therefore demonstrated to have been fractionized.

An organoleptic test of the water sample A and the treated water sample B was conducted. Subjects were asked to compare the two by tasting; substantially all the subjects found the treated water sample B to be more "tasty".

This is because, according to recent study results, there exist tunnels called ion channels (ion passages) penetrating the cell membrane at the surface of the cells in the gustatory buds which sense the tastes, and whenever stimulated, charged atoms (e.g. ions of calcium, magnesium, potassium and sodium) will flow into the cells via the ion channels to thereby change the potential at the cell membrane. This electric stimulus is transmitted and sensed as the taste. When based on this theory, there are too few mineral ions present in large molecular clusters of the water sample A to pass through said ion channels and to be detected as taste. On the other hand, if the molecular clusters are present in abundance in the form of ions of water-soluble minerals as in the case of the treated water sample B, the clusters become fractionized and such small molecular clusters would flow into the cells via the ion channels to be detected as taste. Because the molecular clusters are smaller, they feel mellower on the tongue, making the treated water sample B more "tasty".

The treated water sample B in which the molecular clusters of water have been fractionized tasted better presumably because the smaller molecular clusters would more snuggly fit in the gustatory buds with which the human distinguishes tastes than the larger clusters and feel mellower.

Addition of the solution of water-soluble minerals to the treated water sample neutralizes and removes obnoxious substances such as chlorine by virtue of ion reaction to be discussed below. As shown in FIG. 4, the content of free residual chlorine in particular is confirmed to have been reduced to half the content in the tap water. Contents of water-soluble minerals have also increased, improving the flavor of the water sample B.

| *chlorine ion $Cl^-$, chlorine gas $Cl_2^{2-}$ | |
|---|---|
| $Na^+ + Cl^- \rightarrow NaCl$ | (sodium chloride) |
| $K^+ + Cl^- \rightarrow KCl$ | (potassium chloride) |
| $Ca^{++} + Cl_2^{2-} \rightarrow CaCl_2$ | (calcium chloride) |
| $Mg^{2+} + Cl_2^{2-} \rightarrow MgCl_2$ | (magnesium chloride) |
| *sulfuric acid ion $SO_4$ | |
| $Na^+ \times 2 + SO_4^{2-} \rightarrow Na_2SO_4$ | (sodium sulfate) |
| $K^+ \times 2 + SO_4^{2-} \rightarrow K_2SO_4$ | (potassium sulfate) |
| $Ca^{2+} + SO_4^{2-} \rightarrow CaSO_4$ | (calcium sulfate) |
| $Mg^{2+} + SO_4^{2-} \rightarrow MgSO_4$ | (magnesium sulfate) |
| *nitrous acid ion $NO_2$, nitric acid ion $NO_3$ | |
| $Na^+ + NO_2 \rightarrow NaNO_2$ | (sodium nitrite) |
| $K^+ + NO_3 \rightarrow KNO_3$ | (potassium nitride) |
| $Na^+ + NO_3 \rightarrow NaNO_3$ | (sodium nitride) |
| $Ca^{2+} + NO_2 \times 2 \rightarrow Ca(NO_2)_2$ | (calcium nitride) |
| *phosphoric acid ion $PO_4$ | |
| $Na^+ \times 2 + H^+ + PO_4 \rightarrow Na_2HPO_4$ | (sodium hydrogenphosphate) |
| $K^+ \times 2 + H^+ + PO_4 \rightarrow K_2HPO_4$ | (potassium hydrogenphosphate) |
| $Ca^{2+} + H^+ + PO_4 \rightarrow CaHPO_4$ | (calcium hydrogenphosphate) |
| $Mg^{2+} + H^+ + PO_4 \rightarrow MgHPO_4$ | (magnesium hydrogenphosphate) |

As has been described according to the present invention, mere addition of solution of water-soluble minerals to water to be treated in a very small amount will cause the single molecules of water to collect around the mineral contents (ionized atoms of metal), effecting fractionization of the molecular clusters of water themselves. This very simple method improves the water quality effectively. Water added with solution of water-soluble minerals is highly useful as it can be readily absorbed into the human body and helps supply minerals. The present invention is not merely effective in improving the water quality, but the water added with solution of water-soluble minerals is useful in processing food products and in various other industrial fields where water is used in the products because of improved quality.

Moreover, the present invention has various other advantages such as that the solution of water-soluble minerals according to the present invention is obtainable as a combination of natural substances, and can therefore be easily prepared.

What we claim is:

1. A method for preparing a solution containing water-soluble minerals comprising the steps of pulverizing and mixing at a predetermined ratio to support fermentation, starch or cereal, seed having water-soluble mineral contents and egg shell, adding water to form an aqueous mixture and agitating the same while heating to approximately 80° C. to form a viscous mixture, fermenting the mixture by adding koji to the mixture, and aging the fermented mixture to cause the water-soluble mineral contents in the seed to be dissolved into the aqueous mixture and filtering the resultant fermented and aged mixture to obtain the solution of water-soluble minerals.

2. The method for preparing a solution containing water-soluble minerals as claimed in claim 1 wherein during fermentation, the mixture is agitated to introduce air pumped in by a pumping device while being irradiated with far infrared radiation, and the fermented mixture is further subjected to electrolysis while being caused to flow by pumping during aging.

3. The method of claim 1 wherein the weight ratio of starch or cereal to seed to egg shell is 2.5 to 3.0 to 0.5 and the water is added at a rate of 3:1 of water to pulverized mixture.

* * * * *